P. ENGLE.
FENCE POST MOLD.
APPLICATION FILED JULY 14, 1909.
950,756.
Patented Mar. 1, 1910.
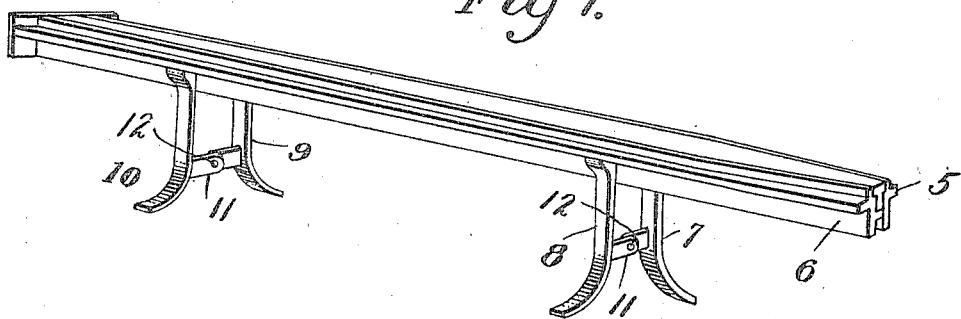
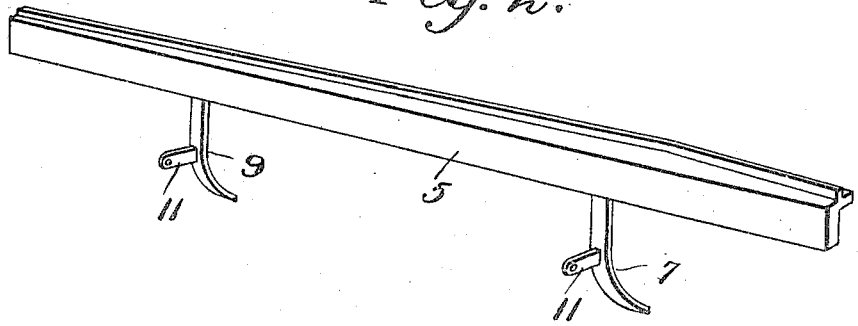
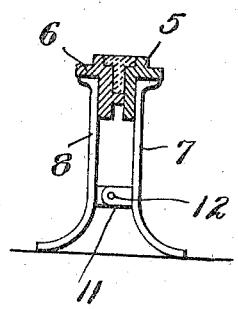
Witnesses
Jo. F. Collins
A. R. Walton
Inventor
Price Engle
By Milo T. Stevens & Co.
Attorneys

UNITED STATES PATENT OFFICE.

PRICE ENGLE, OF ALBANY, INDIANA.

FENCE-POST MOLD.

950,756.   Specification of Letters Patent.   Patented Mar. 1, 1910.

Application filed July 14, 1909. Serial No. 507,538.

*To all whom it may concern:*

Be it known that I, PRICE ENGLE, a citizen of the United States, residing at Albany, in the county of Delaware and State of Indiana, have invented certain new and useful Improvements in Fence-Post Molds, of which the following is a specification.

My invention relates to fence post molds for forming cement fence posts, and my object is to provide a simple and strong device in which pressure thereon serves to contract the sides.

Further objects, and the advantages of my invention will be apparent from the following description in which reference is made to the accompanying drawing, forming part of this specification, and in which—

Figure 1 is a perspective view of my improved mold in the closed position and illustrating a post formed therein; Fig. 2 is a similar view of one of the side mold sections and its supporting legs detached, and Fig. 3 is a central cross-section through the mold in the position shown in Fig. 1.

In the physical embodiment of my invention I provide a mold comprising the opposing side sections 5 and 6, the former of which is shown detached in Fig. 2, and which sections, in order to form a special shaped post, are given the cross-sectional shape shown in Fig. 3. However, their special shape, which is immaterial, is dependent upon the shape of the post desired.

The mold sections 5 and 6 have opposing supporting legs 7 and 8, respectively, adjacent one end, and similar legs 9 and 10, respectively, adjacent their opposite end. These legs are substantially U-shape, having one of their ends suitably secured to the outer surface of their respective mold sections, their opposite ends resting upon a suitable support, and being further provided with inwardly extending intermediate, overlapping pieces 11. The pieces 11, which overlap between opposite side legs are pivoted centrally between such legs by pivot pins 12 whereby when cementitious material is disposed between the upper edges of sections 5 and 6 and pressure applied upon the whole, the lower ends of the several supporting legs will spread, thus forcing the said mold sections to contract or move toward one another.

Thus it will be seen that I provide a simply constructed mold which is strong and durable, and of which many physical changes may be made without departing from the inventive idea.

I claim:

1. A fence post mold comprising opposing mold sections to receive the material therebetween, one of said sections having a side piece abutting the opposite section and forming the mold base, supporting means for said sections, and connections between said supporting means whereby to cause the mold sections to contract toward one another when pressure is applied thereon.

2. A fence post mold comprising opposing mold sections to receive the material therebetween, opposing supporting legs carried by said sections having integral inwardly extending, overlapping, centrally-pivoted pieces, whereby to spread the lower portions of said legs and contact the mold sections toward one another when pressure is applied upon the latter.

In testimony whereof I affix my signature, in presence of two witnesses.

PRICE ENGLE.

Witnesses:
W. E. HODGSON,
IRA J. WILSON.